(12) United States Patent
Kawashima et al.

(10) Patent No.: US 9,825,444 B2
(45) Date of Patent: Nov. 21, 2017

(54) ELECTRICAL WIRE COVER

(71) Applicant: Sumitomo Wiring Systems, Ltd., Yokkaichi, Mie (JP)

(72) Inventors: Naomichi Kawashima, Mie (JP); Naotaka Tanikawa, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/411,756

(22) Filed: Jan. 20, 2017

(65) Prior Publication Data

US 2017/0214228 A1   Jul. 27, 2017

(30) Foreign Application Priority Data

Jan. 22, 2016 (JP) .................... 2016-010428

(51) Int. Cl.
*H02G 3/04* (2006.01)
*F16L 3/233* (2006.01)

(52) U.S. Cl.
CPC ............ *H02G 3/0418* (2013.01); *F16L 3/233* (2013.01); *H02G 3/0456* (2013.01)

(58) Field of Classification Search
CPC ......... F16L 3/2334; F16L 3/233; F16B 19/00; B60R 16/0215; H02G 3/0418; H02G 3/0456; H01R 13/516; H01R 13/447
USPC ................ 248/74.3; 174/68.1, 72 A, 72 TR; 24/16 PB, 17 AP
See application file for complete search history.

(56) References Cited

U.S. PATENT DOCUMENTS

| 3,794,960 A | * | 2/1974 | Sugar | H01R 13/5804 439/459 |
| 3,874,765 A | * | 4/1975 | Gilmore | H01R 13/516 24/16 PB |
| 3,936,129 A | * | 2/1976 | Guy | H01R 13/516 174/138 F |
| 4,160,572 A | * | 7/1979 | Adelberger | H01R 13/5804 439/104 |

FOREIGN PATENT DOCUMENTS

JP         2015103316 A        6/2015

* cited by examiner

*Primary Examiner* — Todd M Epps
(74) *Attorney, Agent, or Firm* — Reising Ethington, P.C.

(57) ABSTRACT

An electrical wire cover prevents the tip of a tie member from being inserted between electrical wires when multiple electrical wires are wrapped by the tie member, and it protects and leads electrical wires to the outside. The electrical wire cover includes an electrical wire insertion portion into which the electrical wires are inserted; a tie member insertion portion provided on the outer circumferential side of the electrical wire insertion portion, and into which a tie member is inserted; a tie member lead-out portion by which the tie member is led to the outside of the electrical wire insertion portion; and an electrical wire fixing portion provided on the outer circumferential side of the electrical wire insertion portion, and that fixes the electrical wires by wrapping them along with the tie member.

5 Claims, 10 Drawing Sheets

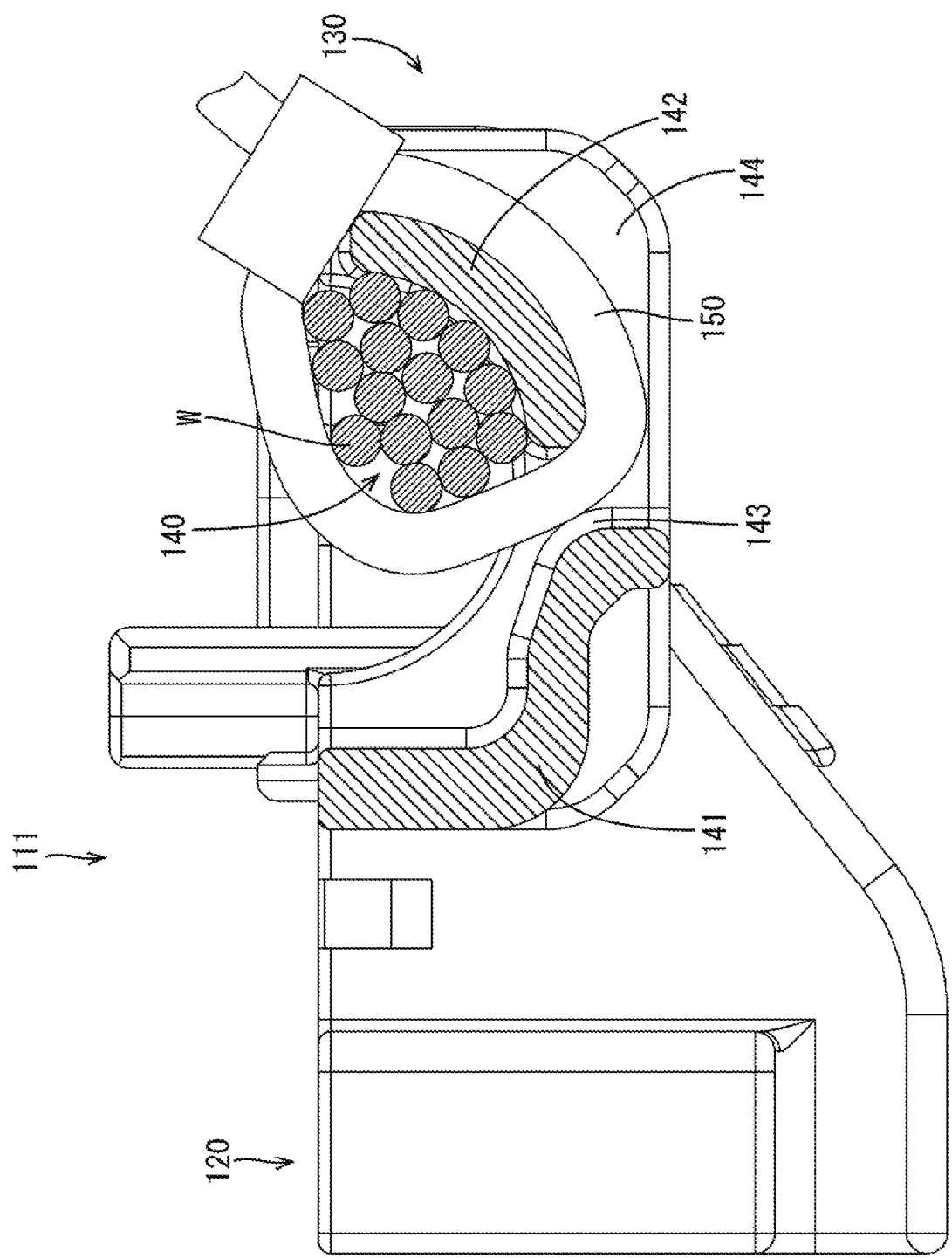

ELECTRICAL WIRE COVER

This Application claims the benefit of Japanese Application No. JP2016-010428, filed on Jan. 22, 2016, the contents of which are hereby incorporated by reference in their entirety.

FIELD

The technology disclosed by the present specification relates to an electrical wire cover.

BACKGROUND

The connector described in JP 2015-103316A is known as a conventional example of a connector for housing a terminal connected to the tip of a branch wire that is branched from a trunk line. A connector cover is attached to the side of the connector on which the branch wire draw-out surface is located. The connector cover has a locking recession portion to which a cable tie is to be attached. The cable tie has a rectangular main body portion, a band portion that extends in an elongated manner and whose base end is connected to the main body portion, a band insertion hole that is a through-hole formed in the main body portion, and a locking protrusion that protrudes from the main body portion. The band portion is wrapped around the trunk line and then inserted into the band insertion hole, thus retaining the band portion. The locking protrusion is then engaged with the locking recession portion by being inserted therein, and thus the cable tie is attached to the connector cover.

However, with the above-described connector cover, there is a possibility of the tip of the band portion being inserted into the trunk line while the band portion is wrapped around the trunk line, and there is a risk that an electrical wire not fixed by the band portion will become free.

SUMMARY

An electrical wire cover according to one aspect of the present design is an electrical wire cover for protecting and leading an electrical wire to the outside, the electrical wire cover including: an electrical wire insertion portion into which the electrical wire is to be inserted; a tie member insertion portion that is provided on an outer circumferential side of the electrical wire insertion portion, and into which a tie member is to be inserted in a direction that intersects an insertion direction of the electrical wire; a tie member lead-out portion by which the tie member inserted into the tie member insertion portion is led to the outside of the electrical wire insertion portion; and an electrical wire fixing portion that is provided on an outer circumferential side of the electrical wire insertion portion, and that fixes the electrical wire by being wrapped along with the electrical wire by the tie member that is led from the tie member lead-out portion to the outside of the electrical wire insertion portion.

According to this configuration, by causing the tie member to enter the tie member insertion portion, it is possible to avoid the case where the tip of the tie member enters the interior of the electrical wire insertion portion. Accordingly, it is possible to prevent the tip of the tie member from being inserted between electrical wires when multiple electrical wires are wrapped by the tie member.

The electrical wire cover according to the above aspect may have any of the following configurations.

A configuration is possible in which the electrical wire insertion portion is U-shaped and open upward, and the tie member lead-out portion is provided on a lower end portion of the electrical wire insertion portion.

According to this configuration, when the tie member is inserted into the tie member insertion portion, the tie member deforms inward along the tie member insertion portion, and the tie member attempts to move outward due to reaction force. For this reason, the tip of the tie member is likely to enter the tie member lead-out portion, and the tie member can be led from the tie member lead-out portion to the outside of the electrical wire insertion portion.

A configuration is possible in which the tie member lead-out portion is provided between the tie member insertion portion and the electrical wire fixing portion.

According to this configuration, after the tie member is led out of the tie member lead-out portion, the tie member is easily wrapped around the electrical wire fixing portion.

A configuration is possible in which in the tie member lead-out portion, the electrical wire fixing portion is arranged at a position closer to the electrical wire insertion portion than the tie member insertion portion is.

According to this configuration, the tie member insertion portion and the electrical wire fixing portion are arranged on respective sides of the tie member lead-out portion with a level difference between them, and therefore it is possible for the tip of the tie member to enter the level difference and then be directly led to the outside of the electrical wire insertion portion.

A configuration is possible in which the electrical wire fixing portion has a pair of shift prevention walls that prevent the tie member from becoming positionally shifted in the insertion direction of the electrical wire.

According to this configuration, positional shift of the tie member in the insertion direction of the electrical wire can be prevented by the pair of shift prevention walls.

According to the electrical wire cover of the present design, it is possible to prevent the tip of the tie member from being inserted between electrical wires when multiple electrical wires are wrapped by the tie member.

DRAWINGS

FIG. 10 is a cross-sectional view of a state in which electrical wires have been fixed to the electrical wire fixing portion by being wrapped by the tie member.

DESCRIPTION

First Embodiment

Figure 1:
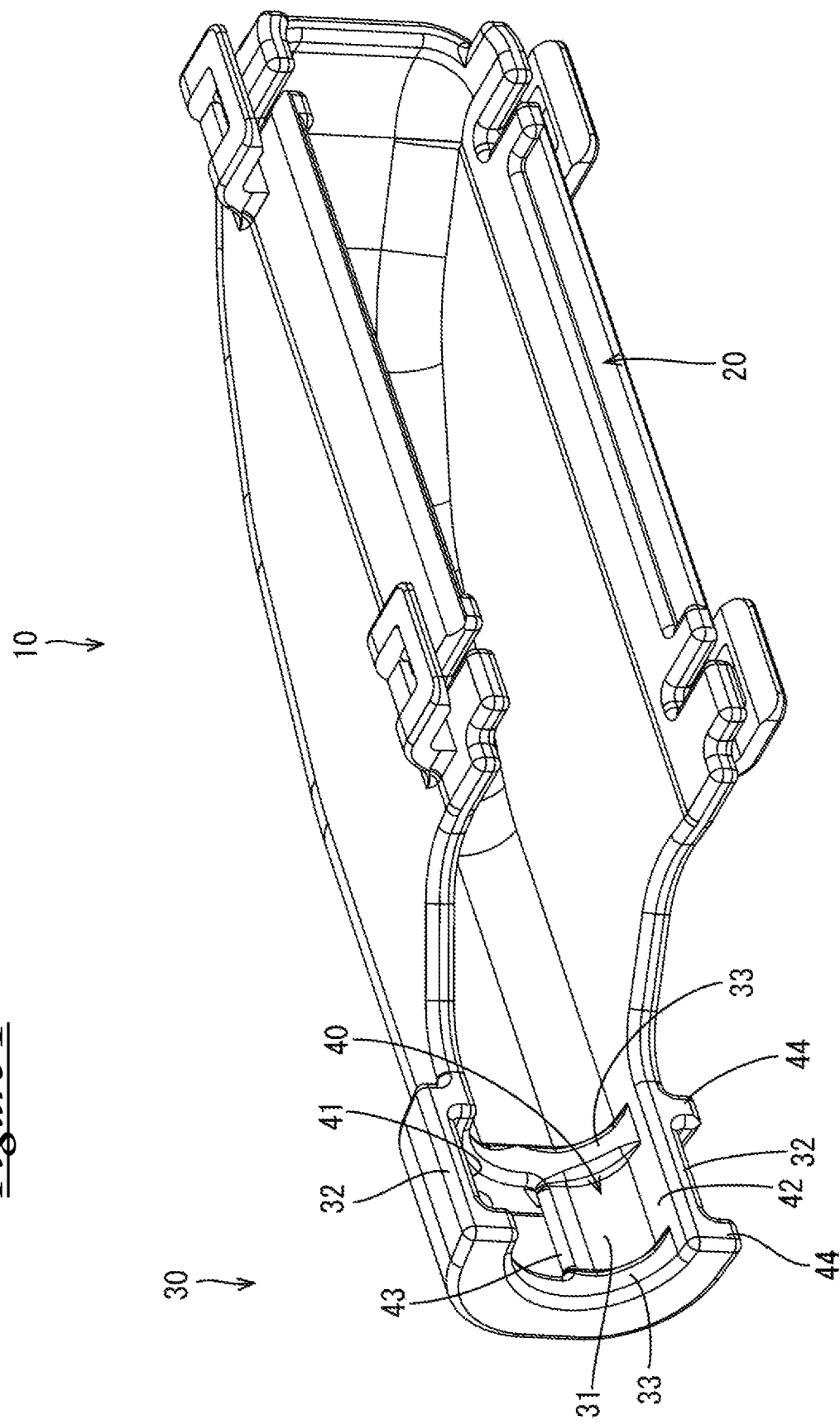
FIG. 1 is a perspective view of an electrical wire cover according to a first embodiment.

A first embodiment will be described below with reference to FIGS. 1 to 5. As shown in FIG. 1, an electrical wire cover 10 of the first embodiment is constituted to include a connector attachment portion 20 that is to be attached to the back surface side of a connector (not shown), and an electrical wire lead-out portion 30 by which electrical wires W drawn out rearward from the back surface of the connector are bent to one side and led to the outside. The region of the electrical wire cover 10 from the connector attachment portion 20 to the electrical wire lead-out portion 30 is open in the drawing direction of the electrical wires W, and the electrical wires W can be housed inside the electrical wire cover 10 through this opening. Normally, multiple electrical wires W are housed inside the electrical wire cover 10, and the electrical wire cover 10 is a member for collectively protecting the electrical wires W, while also leading out the electrical wires W in a bent manner rather than a straight manner.

Figure 2:
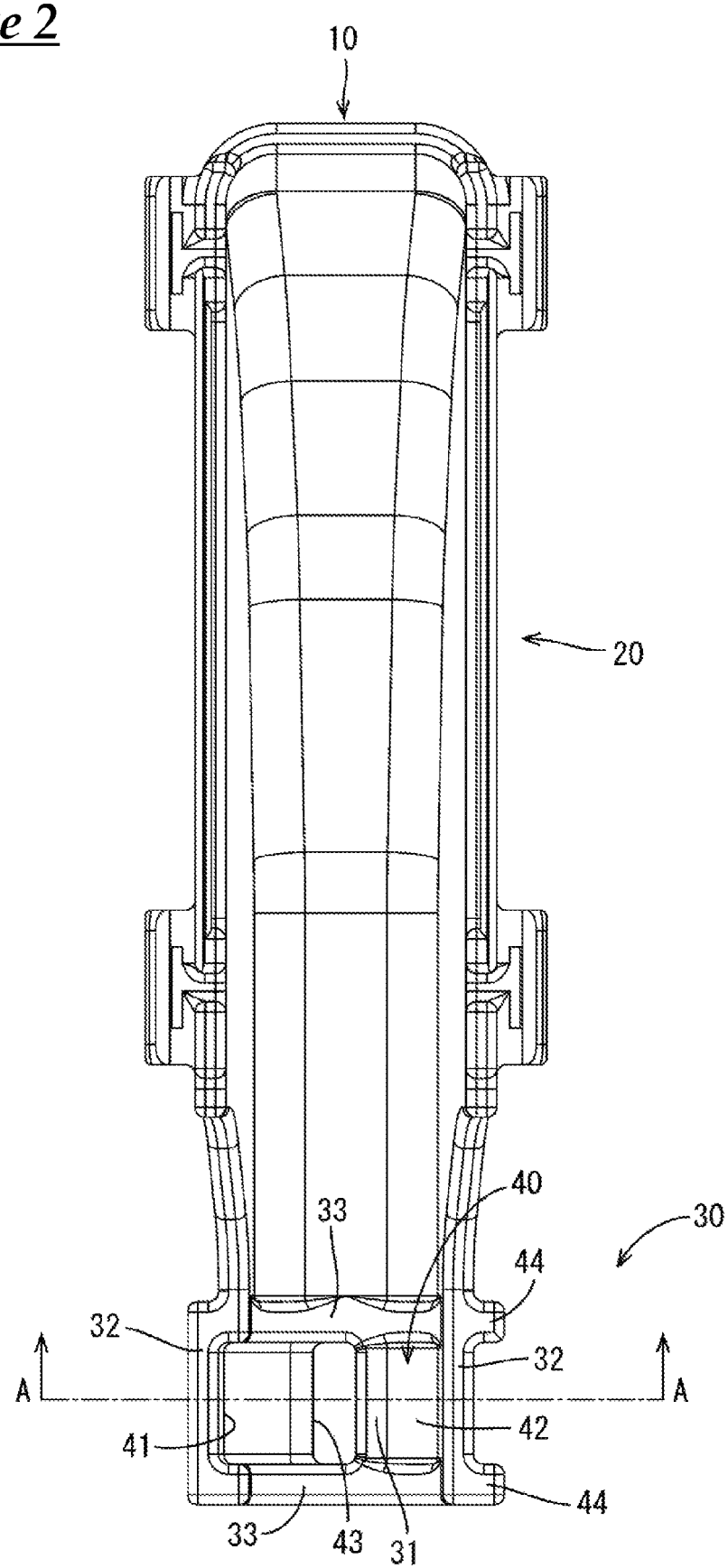
FIG. 2 is a front view of the electrical wire cover.

The electrical wire lead-out portion 30 is approximately U-shaped and open on one side, and is constituted to include a bottom plate 31 and a pair of side walls 32 that rise upward from the two side edges of the bottom plate 31. The pair of side walls 32 are arranged so as to oppose each other and be parallel with each other. Also, as shown in FIG. 2, the bottom plate 31 is provided with two ribs 33 that are arranged side-by-side in the lead-out direction of the electrical wires W (downward direction in FIG. 2). The two ribs 33 are arranged so as to be orthogonal to the lead-out direction of the electrical wires W and be parallel with each other. When the electrical wires W are housed inside the electrical wire cover, the electrical wires W are supported by the two ribs 33 so as to restrict movement toward the bottom plate 31 side due to reaction force.

Figure 3:
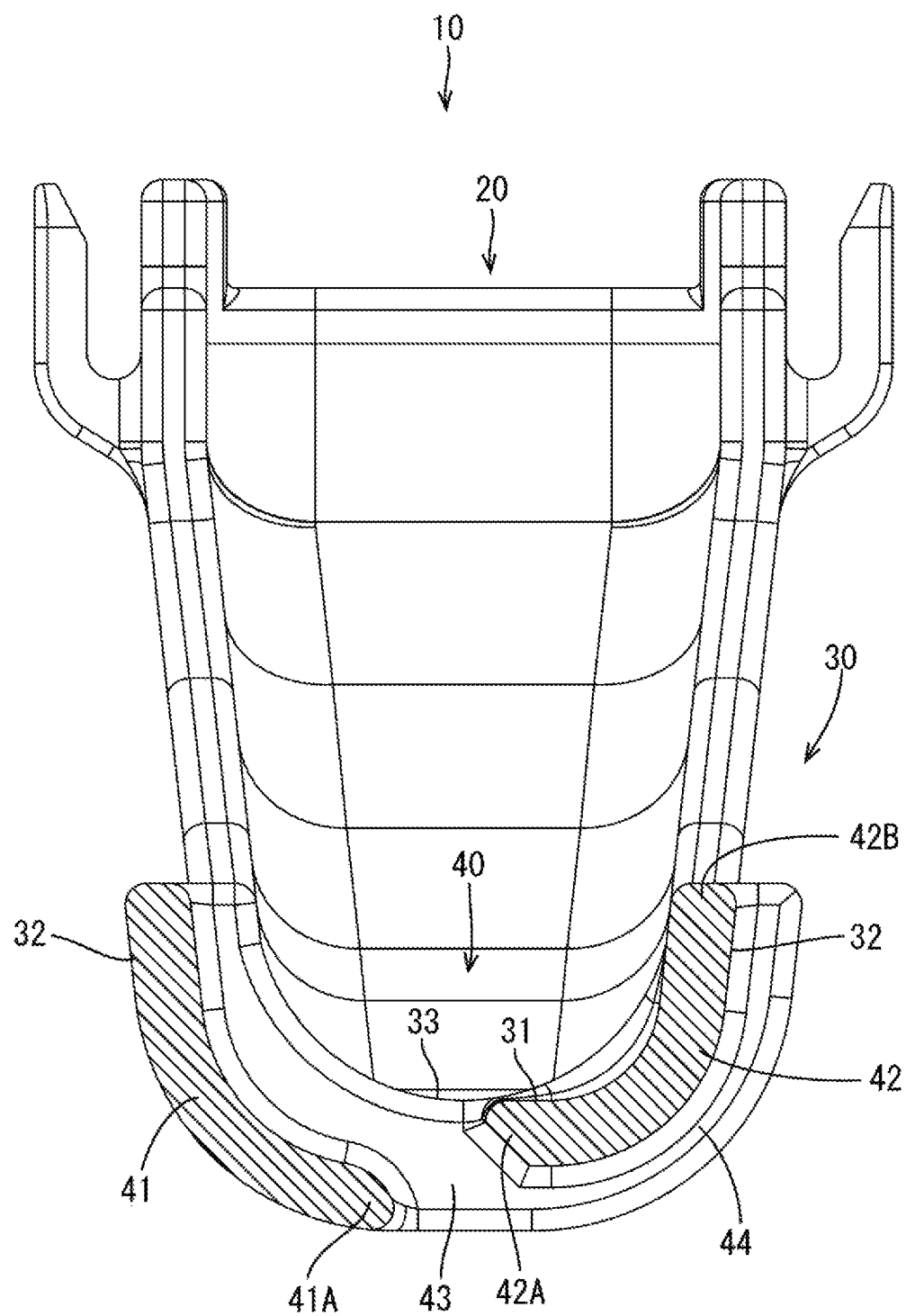
FIG. 3 is a cross-sectional view taken along line A-A in FIG. 2.

As shown in FIG. 3, the inner side of the electrical wire lead-out portion 30 on the connector attachment portion 20 side is an electrical wire insertion portion 40 that is approximately U-shaped and open upward, and the tie member insertion portion 41 and the electrical wire fixing portion 42 are respectively provided on the left and right sides of the electrical wire insertion portion 40. The tie member insertion portion 41 is provided on the outer circumferential side of the electrical wire insertion portion 40, and is configured such that a region extending from the side wall 32 shown on the left side in FIG. 3 to the bottom wall 31 bulges outward from the electrical wire insertion portion 40. Accordingly, the interior of the electrical wire insertion portion 40 and the interior of the tie member insertion portion 41 are in communication with each other. The tie member insertion portion 41 is provided on the outer circumferential side of the electrical wire insertion portion 40, and is positioned circumferentially outward of the ribs 33. For this reason, when the electrical wires W are inserted into the electrical wire insertion portion 40, the electrical wires W do not enter the interior of the tie member insertion portion 41.

On the other hand, the electrical wire fixing portion 42 is provided in a region that extends from the bottom wall 31 to the side wall 32 shown on the right side in FIG. 3, and constitutes a portion of the electrical wire insertion portion 40. A tie member lead-out portion 43 is positioned at approximately the center of the bottom plate 31, and is constituted by a lower end portion 41A of the tie member insertion portion 41 and a lower end portion 42A of the electrical wire fixing portion 42. The interior of the tie member lead-out portion 43 is in communication with the interior of the tie member insertion portion 41, and is configured to be open in the rightward and downward direction shown in FIG. 3.

A pair of shift prevention walls 44 are provided on the outer circumferential sides of a region extending from the bottom plate 31 to the side wall 32 shown on the right side in FIG. 3. The pair of shift prevention walls 44 are provided so as to span between the lower end portion 41A of the tie member insertion portion 41 and an upper end portion 42B of the electrical wire fixing portion 42. In other words, the tie member lead-out portion 43 is provided between the tie member insertion portion 41 and the electrical wire fixing portion 42, and, in the tie member lead-out portion 43, the electrical wire fixing portion 42 is arranged at a position closer to the electrical wire insertion portion 40 than the tie member insertion portion 41 is. The tie member 50 passes between the pair of shift prevention walls 44, and the tie member 50 is prevented from becoming positionally shifted in the insertion direction of the electrical wires W relative to the electrical wire fixing portion 42.

Figure 4:
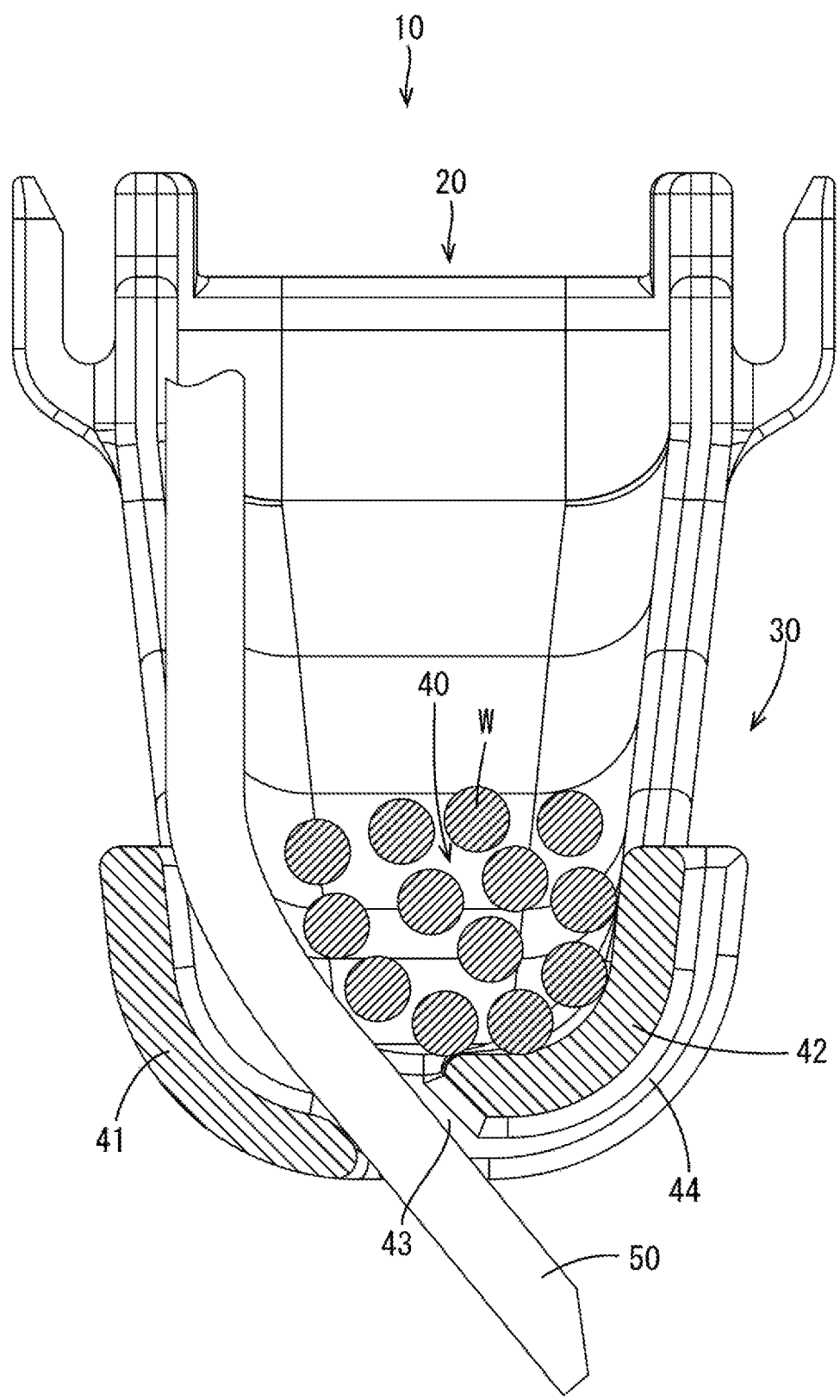
FIG. 4 is a cross-sectional view of a state in which a tie member shown in FIG. 3 has been inserted into a tie member insertion portion.
Figure 5:
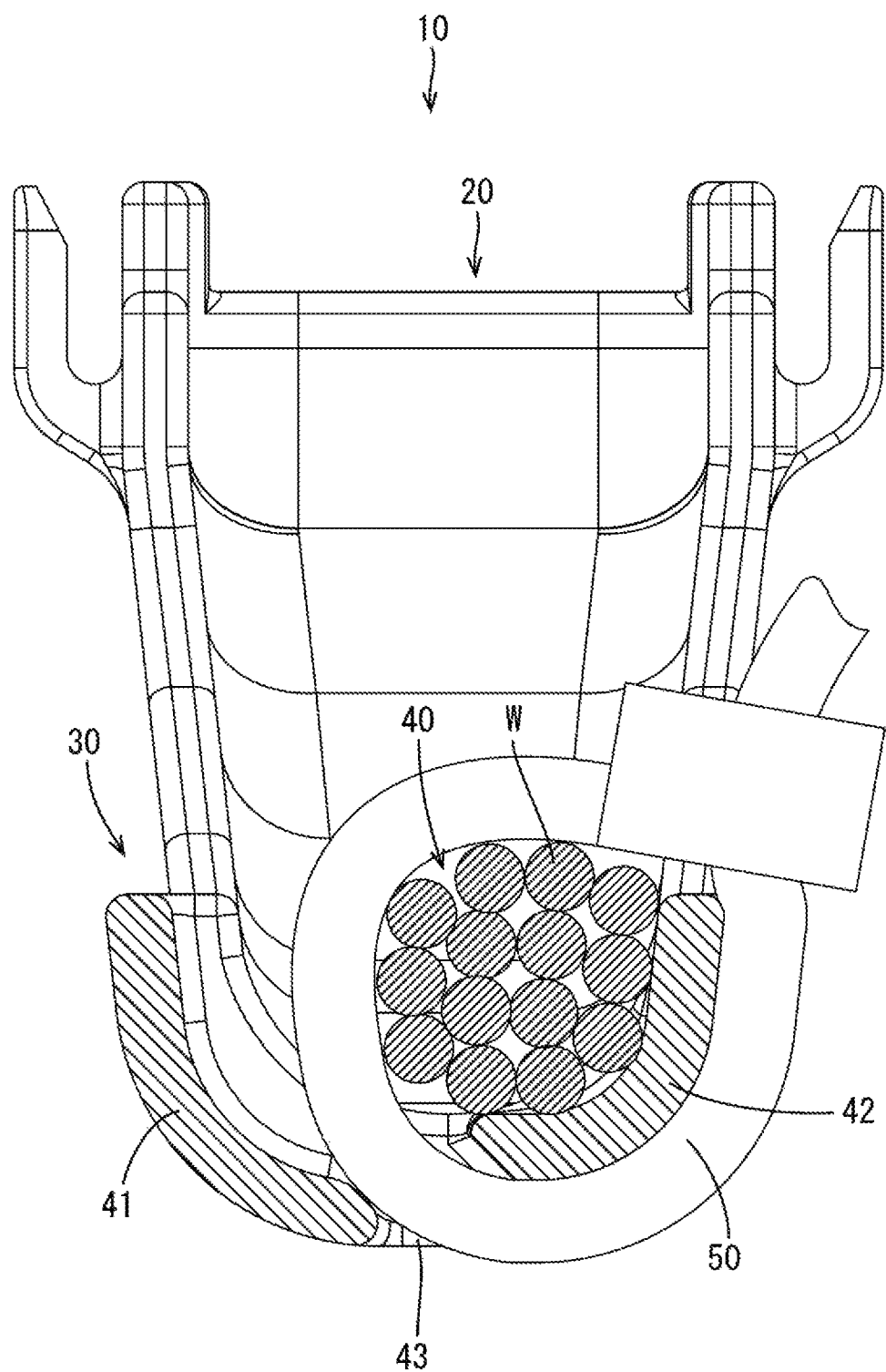
FIG. 5 is a cross-sectional view of a state in which electrical wires have been fixed to an electrical wire fixing portion by being wrapped by the tie member.

The following describes actions of the electrical wire cover 10 having the above-described configuration. When the electrical wire cover 10 is attached to the back surface side of the connector, multiple electrical wires W become inserted in the electrical wire insertion portion 40. Next, the tie member 50 is inserted into the tie member insertion portion 41 and reaches the tie member lead-out portion 43 without being inserted between electrical wires W (without penetrating the bundle of electrical wires W). As shown in FIG. 4, after the tie member 50 is led out of the electrical wire insertion portion 40 by the tie member lead-out portion 43, the tie member 50 passes between the pair of shift prevention walls 44, and then when the tie member 50 is tightened as shown in FIG. 5, the electrical wires W are wrapped by the electrical wire fixing portion 42 and the tie member 50, and the electrical wires W are fixed to the electrical wire fixing portion 42.

As described above, in the first embodiment, by causing the tie member 50 to enter the tie member insertion portion 41, it is possible to avoid the case where the tip of the tie member 50 enters the interior of the electrical wire insertion portion 40. Accordingly, it is possible to prevent the tip of the tie member 50 from being inserted between electrical wires W when multiple electrical wires W are wrapped by the tie member 50.

A configuration is possible in which the electrical wire insertion portion 40 is U-shaped and open upward, and the tie member lead-out portion 43 is provided on the lower end portion of the electrical wire insertion portion 40.

According to this configuration, when the tie member 50 is inserted into the tie member insertion portion 41, the tie member 50 deforms inward along the tie member insertion portion 41, and the tie member 50 attempts to move outward due to reaction force. For this reason, the tip of the tie member 50 is likely to enter the tie member lead-out portion 43, and the tie member 50 can be led from the tie member lead-out portion 43 to the outside of the electrical wire insertion portion 40.

A configuration is possible in which the tie member lead-out portion 43 is provided between the tie member insertion portion 41 and the electrical wire fixing portion 42.

According to this configuration, after the tie member 50 is led out of the tie member lead-out portion 43, the tie member 50 is easily wrapped around the electrical wire fixing portion 42.

A configuration is possible in which, in the tie member lead-out portion 43, the electrical wire fixing portion 42 is arranged at a position closer to the electrical wire insertion portion 40 than the tie member insertion portion 41 is.

According to this configuration, the tie member insertion portion 41 and the electrical wire fixing portion 42 are arranged on respective sides of the tie member lead-out portion 43 with a level difference between them, and therefore it is possible for the tip of the tie member 50 to enter the level difference and then be directly led to the outside of the electrical wire insertion portion 40.

A configuration is possible in which the electrical wire fixing portion 42 includes the pair of shift prevention walls 44 that prevent the tie member 50 from becoming positionally shifted in the insertion direction of the electrical wires W.

According to this configuration, positional shift of the tie member 50 in the insertion direction of the electrical wires W can be prevented by the pair of shift prevention walls 44.

Second Embodiment

Next, a second embodiment will be described below with reference to FIGS. 6 to 10. An electrical wire cover 110 according to the second embodiment is constituted by attaching a pair of half bodies 111 and 112 to each other. Configurations similar to those of the first embodiment are indicated by reference signs obtained by adding 100 to the reference signs used in the first embodiment, and redundant descriptions will not be given for them. Out of the pair of half bodies 111 and 112, the half body 111 on the front side shown in FIG. 6 is provided with an electrical wire insertion portion 140 that is similar to the electrical wire insertion portion 40 of the first embodiment.

Figure 6:
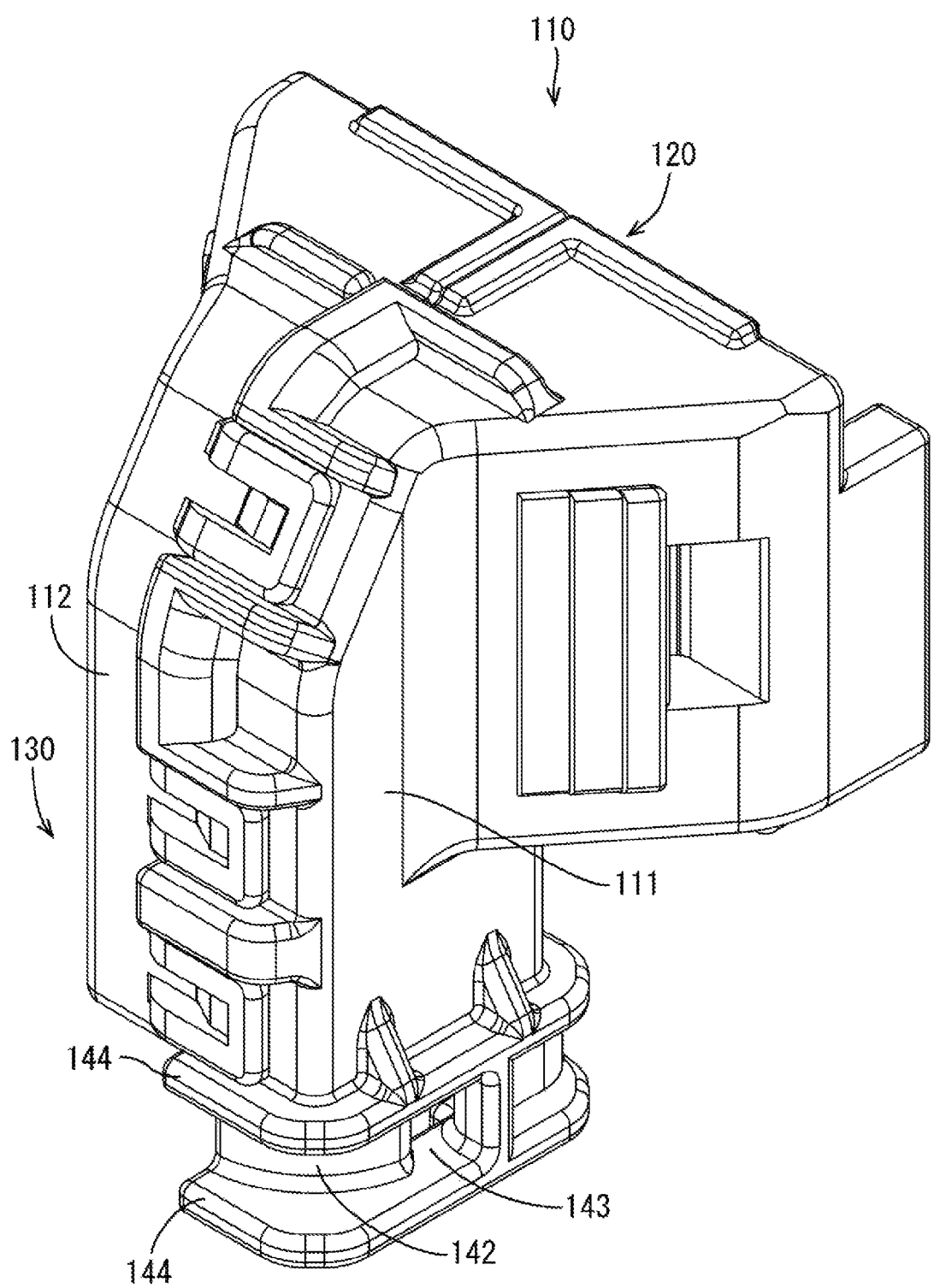
FIG. 6 is a perspective view of an electrical wire cover according to a second embodiment.
Figure 7:
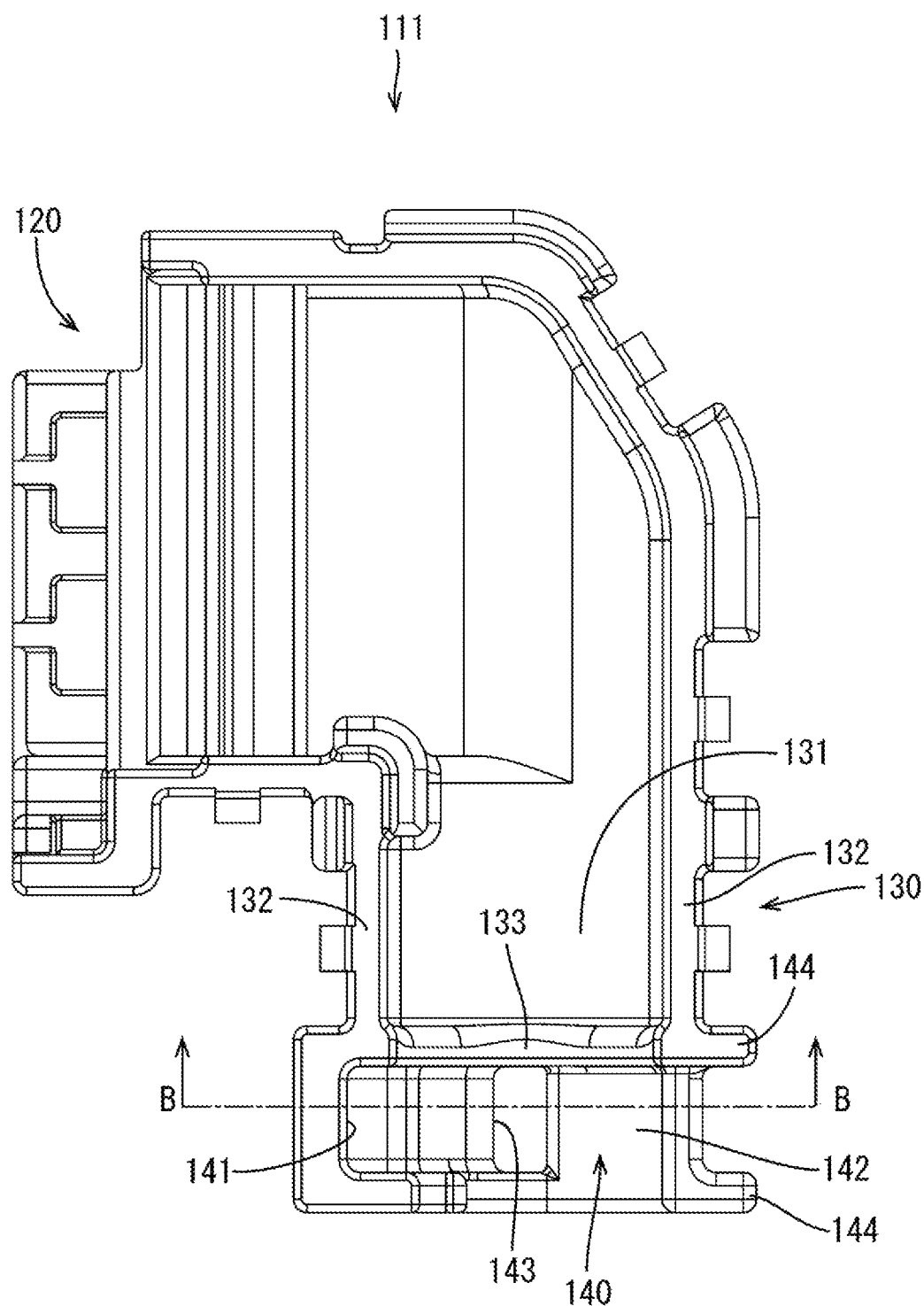
FIG. 7 is a front view of a half body of the electrical wire cover on the electrical wire fixing portion side.
Figure 8:
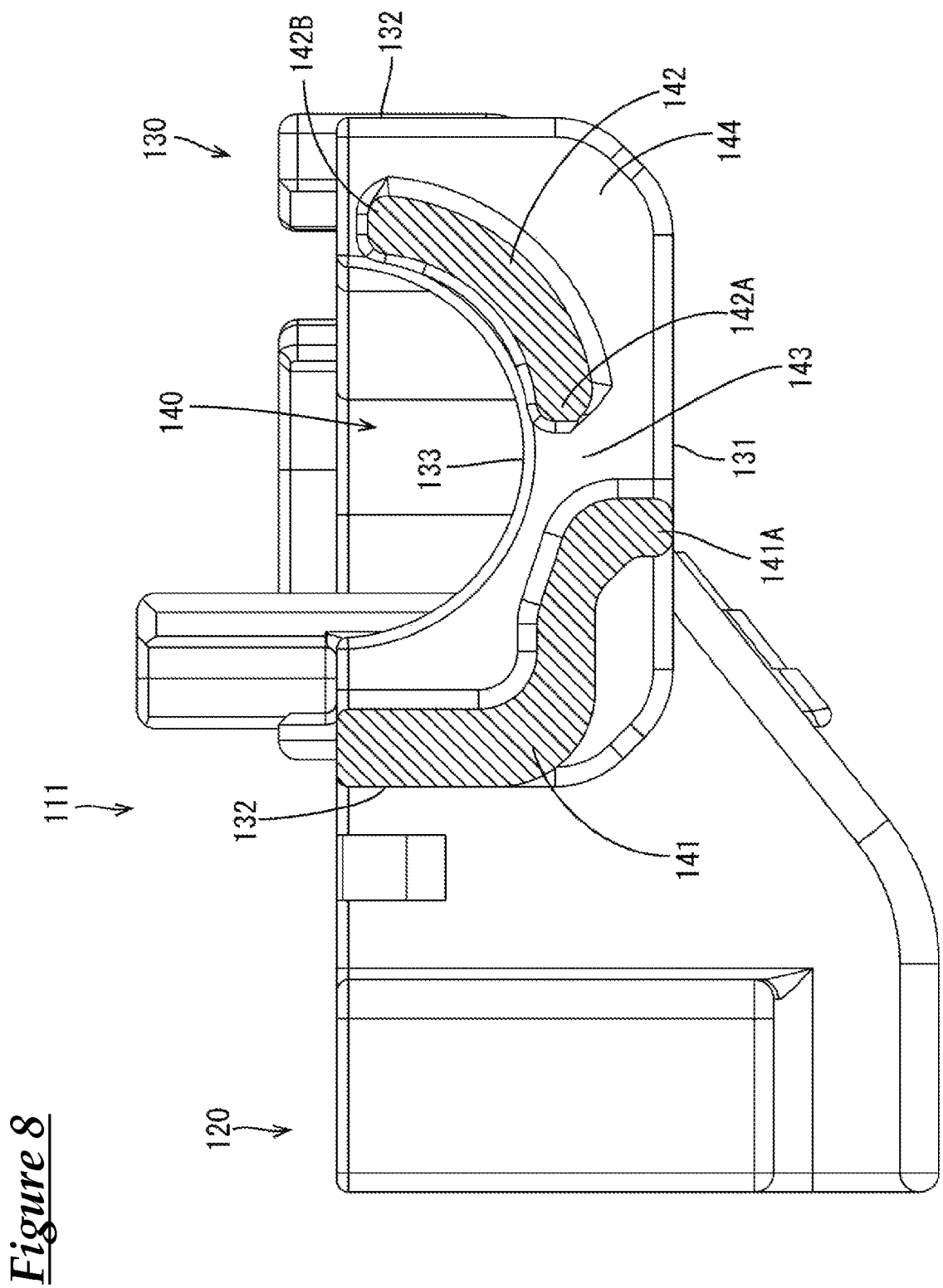
FIG. 8 is a cross-sectional view taken along line B-B in FIG. 7.
Figure 9:
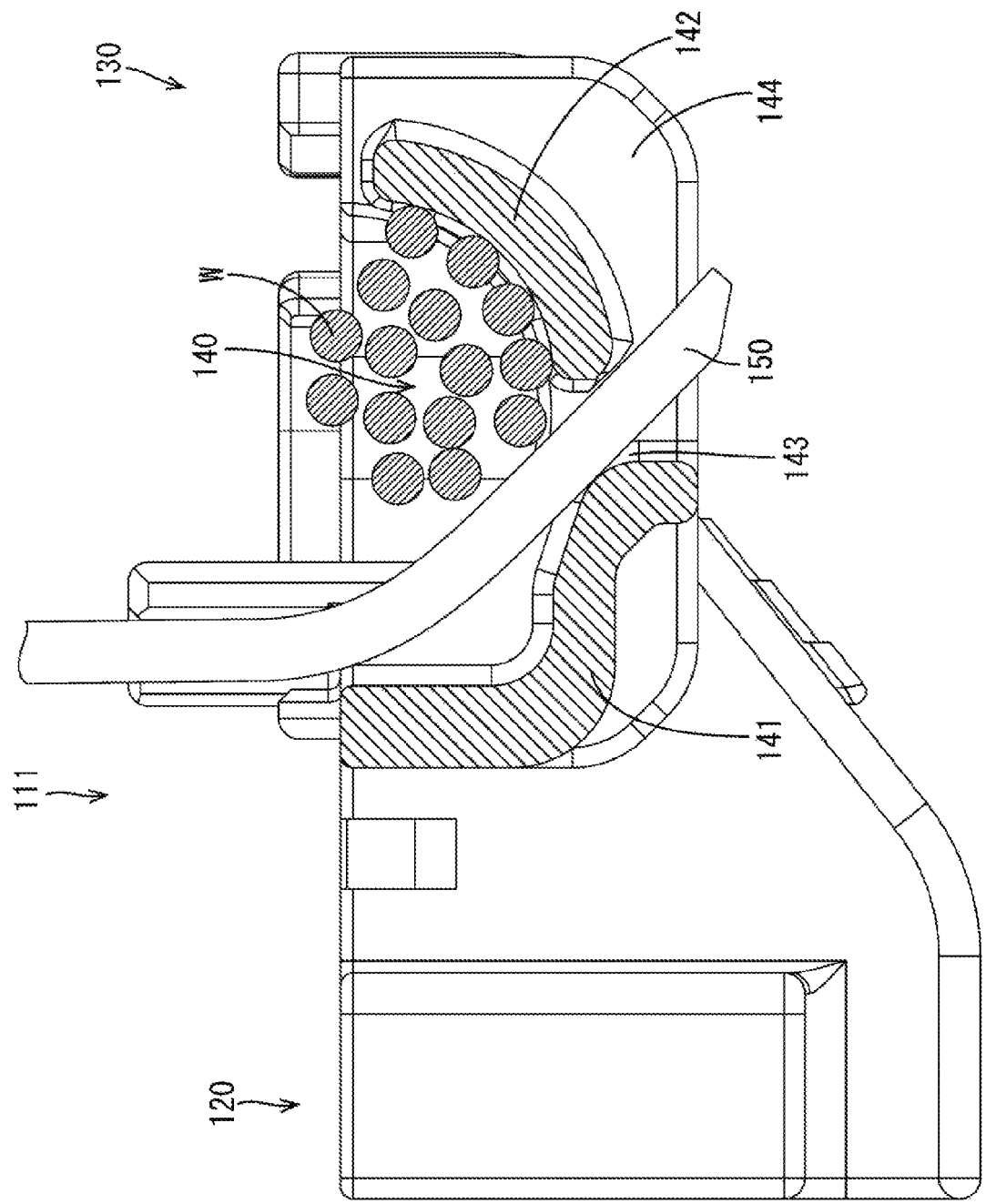
FIG. 9 is a cross-sectional view of a state after the tie member shown in FIG. 8 has been inserted into the tie member insertion portion.

As shown in FIGS. 6 and 7, the electrical wire insertion portion 140 is provided at a position that protrudes from the electrical wire lead-out portion 130 in the lead-out direction of the electrical wires W. As shown in FIG. 8, a tie member insertion portion 141 is shaped as a groove that is deeper than the tie member insertion portion 41 of the first embodiment. Specifically, the tie member insertion portion 141 is provided at a position that is separated from the electrical wire insertion portion 140 as far as possible, and the second embodiment is superior to the first embodiment in terms of reliably preventing a tie member 150 from being inserted between electrical wires W. On the other hand, the height difference of the level difference of the tie member lead-out portion 143 is smaller than that of the tie member lead-out portion 43 of the first embodiment, and the tie member lead-out portion 43 of the first embodiment is superior in terms of the ease of insertion of the tie member 150.

Other Embodiments

The technology disclosed by the present specification is not intended to be limited to the first and second embodiments described using the above descriptions and drawings, and also encompasses various aspects such as the following.

Although the interior of the tie member insertion portions 41 and 141 is in communication with the interior of the electrical wire insertion portion 40 and 140 in the first and second embodiments, a partition wall that partitions the interior of the tie member insertion portion and the interior of the electrical wire insertion portion may be provided.

Although the electrical wire insertion portions 40 and 140 are U-shaped and open upward in the first and second embodiments, the electrical wire insertion portion may be shaped as a closed circular ring.

Although the tie member lead-out portions 43 and 143 are formed having a level difference in the first and second embodiments, the tie member lead-out portion may be formed without a level difference.

Although the electrical wire fixing portions 42 and 142 have the pair of shift prevention walls 44 and 144 in the first and second embodiments, the electrical wire fixing portion may have only one shift prevention wall 44 or 144.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

REFERENCE SIGNS LIST

10, 110: Electrical wire cover
20, 120: Connector attachment portion
40, 140: Electrical wire insertion portion
41, 141: Tie member insertion portion
42, 142: Electrical wire fixing portion
43, 143: Tie member lead-out portion
44, 144: Shift prevention wall
50, 150: Tie member
W: Electrical wire

The invention claimed is:

1. An electrical wire cover for protecting and leading an electrical wire, the electrical wire cover comprising:
   an electrical wire insertion portion into which the electrical wire is to be inserted;
   a tie member insertion portion that is provided on an outer circumferential side of the electrical wire insertion portion, and into which a tie member is to be inserted in a direction that intersects an insertion direction of the electrical wire;
   a tie member lead-out portion by which the tie member inserted into the tie member insertion portion is led to an area outside of the electrical wire insertion portion; and
   an electrical wire fixing portion that is provided on the outer circumferential side of the electrical wire insertion portion, and that fixes the electrical wire by being wrapped along with the electrical wire by the tie member that is led from the tie member lead-out portion to the area outside of the electrical wire insertion portion; and at least one shift prevention wall that is provided on an outer circumferential side of the electrical wire fixing portion and that spans between a lower end of the electrical wire fixing portion and an upper end of the electrical wire fixing portion, wherein the at least one shift prevention wall helps prevent the tie member from being shifted in the insertion direction of the electrical wire.

2. The electrical wire cover according to claim 1, wherein the electrical wire insertion portion is U-shaped and open upward, and the tie member lead-out portion is provided on a lower end portion of the electrical wire insertion portion.

3. The electrical wire cover according to claim 1, wherein the tie member lead-out portion is provided between the tie member insertion portion and the electrical wire fixing portion.

4. The electrical wire cover according to claim 1, wherein in the tie member lead-out portion, the electrical wire fixing portion is arranged at a position closer to the electrical wire insertion portion than the tie member insertion portion is.

5. The electrical wire cover according to claim 1, wherein the at least one shift prevention wall is part of a pair of shift prevention walls that prevent the tie member from becoming positionally shifted in the insertion direction of the electrical wire.

* * * * *